US012427451B2

(12) United States Patent
Lemley

(10) Patent No.: US 12,427,451 B2
(45) Date of Patent: Sep. 30, 2025

(54) VACUUM ASSISTED FILTRATION

(71) Applicant: Tokyo Electron Limited, Tokyo (JP)

(72) Inventor: Corey Lemley, Albany, NY (US)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

(21) Appl. No.: 18/411,963

(22) Filed: Jan. 12, 2024

(65) Prior Publication Data

US 2024/0149193 A1 May 9, 2024

Related U.S. Application Data

(62) Division of application No. 16/788,619, filed on Feb. 12, 2020, now abandoned.

(51) Int. Cl.
*B01D 29/96* (2006.01)
*B01D 29/88* (2006.01)
*B01D 36/00* (2006.01)

(52) U.S. Cl.
CPC .............. *B01D 29/96* (2013.01); *B01D 29/88* (2013.01); *B01D 36/001* (2013.01); *B01D 2201/165* (2013.01); *B01D 2201/204* (2013.01); *B01D 2201/54* (2013.01); *B01D 2221/14* (2013.01)

(58) Field of Classification Search
CPC ...... B01D 29/96; B01D 29/88; B01D 36/001; B01D 2201/165; B01D 2201/204; B01D 2201/54; B01D 2221/14; B01D 24/08; B01D 24/10; B01D 24/383; B01D 24/48
See application file for complete search history.

(56) References Cited

U.S. PATENT DOCUMENTS

| 2,326,484 A | 8/1943 | Moreton |
| 4,601,409 A | 7/1986 | DiRegolo |
| 5,527,161 A | 6/1996 | Bailey et al. |
| 5,636,762 A | 6/1997 | Juhola et al. |

(Continued)

FOREIGN PATENT DOCUMENTS

| CN | 110083016 A | 8/2019 |
| KR | 20020076072 A | 10/2002 |
| KR | 20060020138 A | 3/2006 |

OTHER PUBLICATIONS

Notice of TW Office Action, Taiwanese Patent Application No. 110104709, Nov. 11, 2024, 10 pages.

(Continued)

*Primary Examiner* — Liam Royce
(74) *Attorney, Agent, or Firm* — Slater Matsil, LLP

(57) ABSTRACT

A method of supplying a processing solution includes shutting off a feed line supplying the processing solution to a chemical filter, installing a dry chemical filter in a filter housing of the chemical filter, closing an output line from the filter housing to a nozzle configured to dispense the processing solution (either before or after installing the dry chemical filter), applying a vacuum to the filter housing while the feed line remains shut, and opening the feed line while locking in the vacuum within the filter housing. Shutting off the feed line and closing the output line may be accomplished by closing respective valves. Before installing the dry filter, a valve to the vacuum may be closed. The method may be performed by a processor executing a program stored in a non-transitory computer-readable medium.

13 Claims, 7 Drawing Sheets

(56) References Cited

U.S. PATENT DOCUMENTS

| | | |
|---|---|---|
| 6,238,576 B1 | 5/2001 | Yajima |
| 6,554,579 B2 | 4/2003 | Martin et al. |
| 9,162,163 B2 | 10/2015 | Yoshida et al. |
| 9,375,665 B2 | 6/2016 | Kao et al. |
| 9,576,829 B1 | 2/2017 | Marumoto et al. |
| 9,975,073 B2 | 5/2018 | Yoshida et al. |
| 2002/0158079 A1* | 10/2002 | Martin .................. F04B 53/16 222/64 |
| 2005/0175472 A1 | 8/2005 | Udagawa |
| 2007/0119307 A1 | 5/2007 | Park et al. |
| 2014/0034584 A1 | 2/2014 | Marumoto et al. |
| 2014/0097147 A1 | 4/2014 | Yoshida et al. |
| 2015/0367266 A1 | 12/2015 | Yoshida et al. |
| 2017/0043287 A1 | 2/2017 | Marumoto et al. |

OTHER PUBLICATIONS

PCT International Search Report and the Written Opinion of the International Searching Authority; PCT Application No. PT/US2021/015637, May 17, 2021, 9 pages.

\* cited by examiner

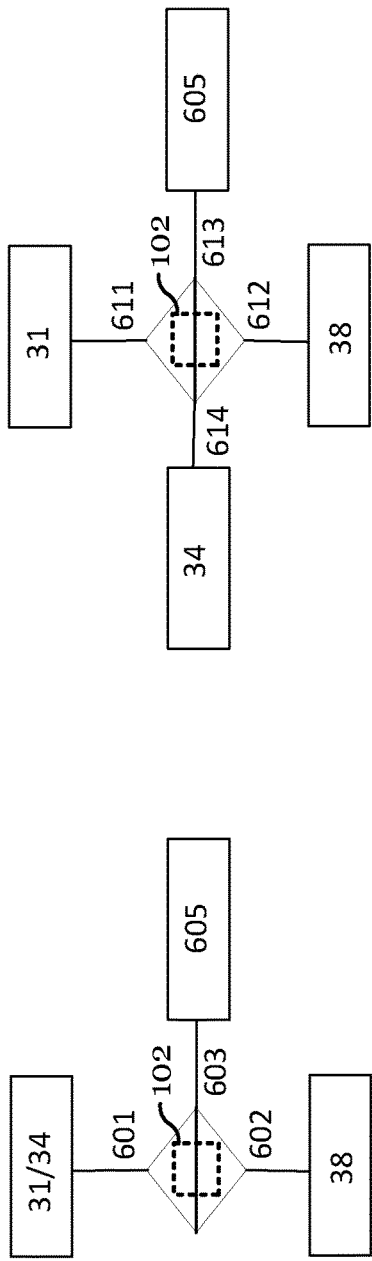
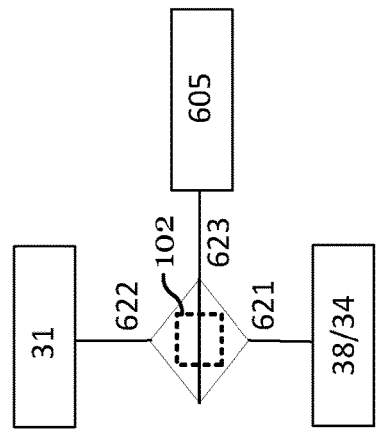
Fig. 6A
Fig. 6B
Fig. 6C

VACUUM ASSISTED FILTRATION

CROSS-REFERENCE TO RELATED APPLICATIONS

This application is a divisional application of U.S. application Ser. No. 16/788,619, filed on Feb. 12, 2020, entitled "Vacuum Assisted Filtration" which application is incorporated herein by reference in its entirety.

TECHNICAL FIELD

The present invention relates generally to a system and method for semiconductor equipment, and in particular embodiments, to vacuum assisted filtration.

BACKGROUND

In the manufacturing of semiconductor devices, a filter is used within the chemical dispense system to remove foreign matter (i.e., small particles, debris, particulates, etc.) from processing solutions. The filtration system ensures foreign matter does not reach the dispense line and make its way onto the wafer.

In addition to foreign matter that finds its way into the filtration system, trapped air—which gives rise to the formation of bubbles—can also be problematic. Taking into account the scaling of critical dimensions (CDs) and increased miniaturization of features within semiconductor devices, even fine bubbles that were not once a problem can become troublesome. In the event the bubbles are not removed from the filtration system, and instead make their way through the dispense line and onto the wafer, yield can be heavily impacted.

Hence, strategies to improve the filtration equipment become increasingly needed. However, current suggestions to improve filtration equipment involve lengthy installation processes, extended equipment downtimes, extensive requalification procedures, and excessive chemical purges. Such suggestions are not practical in semiconductor manufacturing with a need to reduced costs while maximizing throughput.

SUMMARY

An apparatus includes a chemical filter fluidly coupled between a source for a processing solution and a nozzle to dispense the processing solution. The chemical filter is configured to filter the processing solution from the source. The apparatus may include a vacuum pump that is configured to apply a vacuum to the chemical filter. The apparatus may include a valve system configured to operate in a first operating state and a second operating state, where in the first operating state the valve system is configured to couple the source to the chemical filter and block the vacuum to the chemical filter, and where in the second operating state the valve system is configured to couple the vacuum to the chemical filter and block the source to the chemical filter.

A method of supplying a processing solution includes shutting off a feed line supplying the processing solution to a chemical filter and installing a dry chemical filter in a filter housing of the chemical filter. The method may further include closing an output line from the filter housing to a nozzle configured to dispense the processing solution. The method may further include applying vacuum to the filter housing. The method may further include opening the feed line while locking in the vacuum within the filter housing.

A device includes a memory storing a program to be executed in a processor. The program includes instructions to shut off a feed line supplying a processing solution to a chemical filter. The program may include instructions to close an output line from the filter housing to a nozzle configured to dispense the processing solution after installing a chemical filter in a filter housing of the chemical filter. The program may include instructions to apply vacuum to the filter housing; and open the feed line while locking in the vacuum within the filter housing.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3A-3C illustrate a cross sectional schematic magnified representation of a chemical filter in accordance with an embodiment of the present invention, wherein FIG. 3A illustrates a filtration channel being blocked by air voids, wherein FIG. 3B illustrates a chemical filter before undergoing a vacuum assisted wetting process to remove air voids, wherein FIG. 3C illustrates filtration channels being free of air voids after undergoing a vacuum assisted wetting process;

Figure 1:
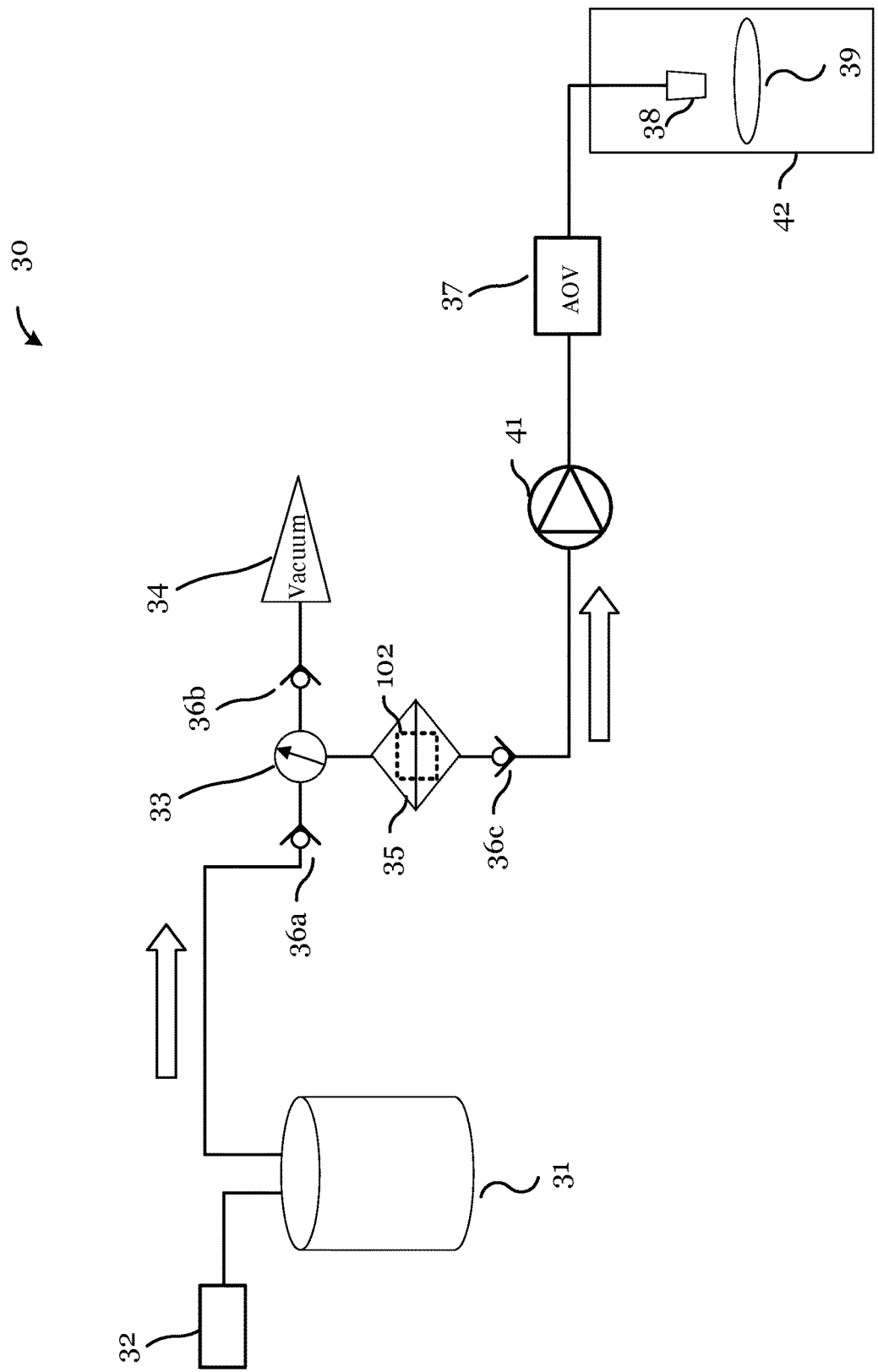
FIG. 1 illustrates a piping diagram of a filtration apparatus in accordance with an embodiment of the present invention.

The drawings are not necessarily drawn to scale. The drawings are merely representations, not intended to portray specific parameters of the invention. The drawings are intended to depict only specific embodiments of the inventions, and therefore should not be considered as limiting in scope. In the drawings, like numbering represents like elements.

FIGS. 6a-6C illustrate details of the chemical filter in various embodiments.

DETAILED DESCRIPTION OF ILLUSTRATIVE EMBODIMENTS

The structure, method, and using of various embodiments of a chemical filtration apparatus are discussed in detail below. However, it should be valued that the various embodiments detailed herein may be applicable in a wide variety of disciplines. The specific embodiments described herein are merely illustrative of specific ways to make and use various embodiments, and should not be construed in a limited scope.

Air is introduced into the chemical dispense system through a wide array of manifestations. For example, it can occur during routine filter installation and removal procedures; through trapped air hidden within plumbed chemical lines; through faulty O-rings generating weakened seals amongst the filter manifold, housing, or support structures, thus allowing air to bleed into the filtration system; and/or through dissolved gas within the processing solutions (i.e., photoresists, solvents, etc.)

Once air is introduced, it traverses the porous membrane of the chemical filter, becoming trapped within the filtration material comprised within the inner shell of the chemical filter. This in turn creates small pockets of air voids that become difficult to dislodge through conventional removal strategies. As the air pockets accumulate they cause blockages within the filtration channels. The blockages prevent foreign matter from accessing the filtration channels. This negatively affects the wetting efficiency of the chemical filter, thus decreasing the number of available the flow paths. Consequently, the blocked filtration channels may give rise to a buildup of foreign material that can clog areas of the filtration material. Overtime, this build up can place extra demand on any auxiliary pumps downstream of the chemical filter; can rupture the inner membrane of the filter; can further downgrade the efficiency of the filter; and/or can decrease the lifetime of the filter, thus prompting frequent filter replacements.

Embodiments of the present invention disclose a system and method that uses vacuum to eliminate or reduce air voids. Accordingly, embodiments of the present invention relate to a vacuum assisted filtration system used to increase the wetting efficiency of chemical filters by removing air voids that block filtration channels. With increased wetting efficiency, cleaner processing solution may be dispensed so as to improve product yield. An embodiment filtration apparatus will be first described using FIG. 1. Alternate embodiments of the filtration apparatus will be first described using FIGS. 4, 5A-5B. A detailed process of using the filtration apparatus will be described using FIGS. 2, and 3A-3C.

FIG. 1 illustrates a piping diagram of a filtration apparatus in accordance with an embodiment of the present invention.

The filtration apparatus 30, in one or more embodiments, may be part of a semiconductor processing tool. For example, the filtration apparatus 30 may be part of a lithographic tool.

The filtration apparatus 30 comprises a source of inert gas 32 such as nitrogen ($N_2$) coupled to a source 31 of processing solution. The processing solution 106, in various embodiments, may comprise chemicals related to chemical processes involved in semiconductor processing that require the use of filtration to maintain manufacturability. The processing solution 106, in one or more embodiments, may comprise chemicals used in photolithography processes, wet cleaning processes, deposition process liquid precursor, or etching process liquid precursor. The source 31 is configured to provide a processing solution 106 and may include a holding tank and accompanying pumping equipment to pump the processing solution 106. The source 31 may be enclosed within a bottle, container, reservoir, or other enclosures. As an illustration, the source 31 may comprise bottles of plumbed solution disposed within a resist cart of a lithographic tool and coupled to further equipment as further discussed below.

Downstream of the source 31 is a valve system that comprises a first check valve 36a, followed by a three-way valve 33, then a second check valve 36b. The second check valve 36b is further coupled to a vacuum 34 and its pumping system.

A manifold 35 is disposed downstream from the three-way valve 33. The manifold 35 houses a chemical filter 102. A processing solution flows through the chemical filter 102 and is filtered. In various embodiments, the manifold 35 may comprise a cylindrical housing within which the chemical filter 102 is mounted. The manifold 35 is fluidly coupled with the nozzle 38 through a third check valve 36c, a pump, and an air operated valve (AOV) 37.

A resist (chemical) pump 41 is located downstream of the chemical filter 102. The pump 41 is configured to move or pump the processing solution 106, for example, by mechanical action. In various embodiments of the invention, the type or classification of pump used in the system will largely depend on the method by which it uses to move the fluid (i.e., displacement, gravity, etc.). Nevertheless, the pump 41 helps to draw the processing solution 106 from the chemical filter 102, e.g., by positive displacement, and feed the processing solution 106 through the dispense line and into the nozzle 38.

The nozzle 38, which is at one end of the dispense line, is configured to dispense the processing solution 106 to the surface of a wafer 39. The nozzle 38 and the wafer 39 may be placed within a chamber 42.

The air operated valve (AOV) 37 located in the dispense line between the nozzle 38 and the pump 41 may be used to electronically control the dispense quality of the processing solution 106 that exits the nozzle 38. Examples of flow parameters set by the AOV 37 may include flow rate and fluid volume, suck back, and others.

According to embodiments of the vacuum assisted filtration apparatus 30, the manifold 35 comprises an input port such as input feed pipe. The input feed pipe is fluidly coupled to the source 31 and the vacuum 34 and its pumping system. The manifold 35 further comprises an outlet port such as an output feed pipe that is fluidly coupled to the nozzle 38. The manifold 35 may also include an additional port such as an exhaust pipe designed to be coupled to an exhaust vent. The exhaust vent system may be coupled to the chemical filter 102. The function of the exhaust vent is to flush the processing solution 106 from the chemical lines leading up to, and possibly leading away from, the chemical filter 102. Thus, the processing solution 106 to be filtered enters the manifold 35 through the input feed pipe and exits the manifold 35 through the output feed pipe.

Accordingly, the valve system comprises a first check valve 36a, a second check valve 36b, a third check valve 36c, a three-way valve 33, and an air operated valve (AOV) 37. In various embodiments, the valve system is configured to operate in a first operating state and a second operating state. In the first operating state, the valve system is configured to couple the source 31 to the chemical filter 102 and block the vacuum 34 and its pumping system from the chemical filter 102. In the second operating state, the valve system is configured to couple the vacuum 34 and its pumping system to the chemical filter 102 and block the source 31 from the chemical filter 102. During normal operation, the valve system is operated in the first operating state. The valve system is operating in the second operating state only during a filter replacement operation or during a filter cleaning operation as will be described in further detail below.

In one or more embodiments, the valve system may further comprise a controller configured to switch the valve system from the first operating state to the second operating state. The controller could be the three-way valve 33 in one embodiment. Or in various embodiments of the invention, the controller may comprise a solenoid valve, or any other valve system currently known to those in the art.

In one or more embodiments of the vacuum assisted filtration apparatus 30, the controller and its support components may be designed to operate manually. Alternatively, in other embodiments the controller may be a microcontroller or a microprocessor and may be designed to operate electronically.

In various embodiments of this present invention, the filtration apparatus 30 can be used with any aqueous materials including systems that filter water or pharmaceutical materials. In various embodiments of the filtration apparatus 30, the processing solution 106 may comprise semiconductor processing solutions such as photoresist, polyimide liquid resin, deionized water, etchant, organic solvent, tetramethylammonium hydroxide (TMAH), bottom layer anti-reflective coating (BARC), Si-containing anti-reflective coating (SiARC), top layer anti-reflective coating (TARC), immersion top coat, negative tone developer, and others.

A description of the operation of the filtration apparatus 30 during filter replacement will be described using FIG. 2.

Figure 2:
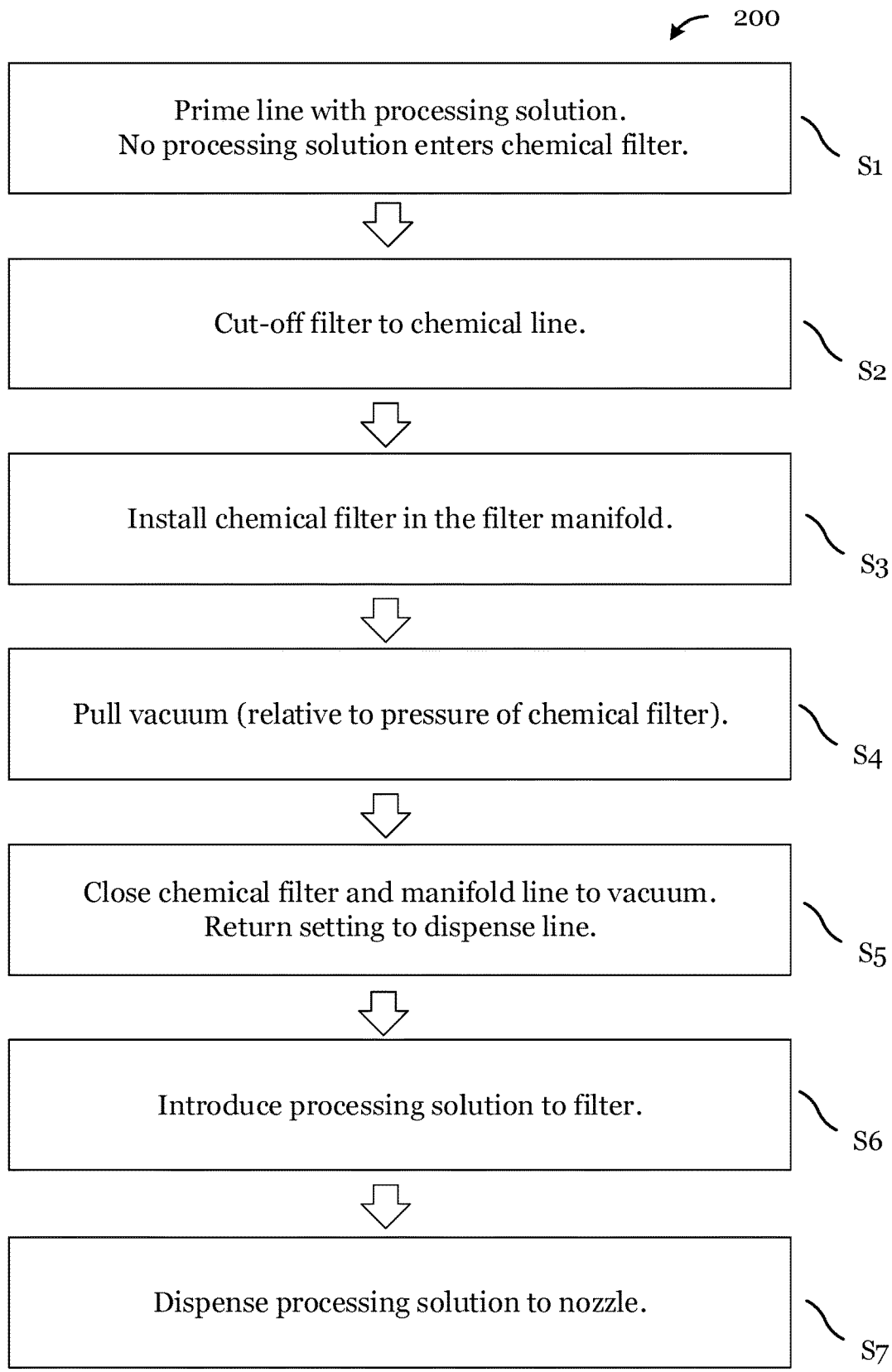
FIG. 2 is a flow diagram describing a process for replacing a chemical filter in accordance with an embodiment of the present invention.

FIG. 2 is a flow diagram describing a process for replacing a chemical filter in accordance with an embodiment of the present invention.

This flow diagram starts with a request to install a new chemical filter within the manifold 35, e.g., of the filtration apparatus 30 of FIG. 1. However, the actual process flow followed may be different depending on the state of the filtration apparatus 30 and what is intended to be done. For example, when the filtration apparatus 30 is already in production and the filter has become dirty and is being replaced, no or limited priming of the various distribution pipes/lines may be performed. In particular, a priming process may not be performed when the solution being dispensed after the filter change continues to be the same in a production process. This is because the various distribution pipes/lines are likely to be already clean. However, if the processing solution being dispensed will be different after the filter change or if the filtration apparatus 30 is being installed in a new system (if it is not a previously plumbed line) an initial priming process will be performed so as to clean the various distribution pipes/lines.

Accordingly, an embodiment of the step S1 includes determining whether priming is to be performed. After making this determination, in case priming is to be performed, this optional step S1 may involve following a sequence of standard process steps but primarily involves continually flushing the dry line with a solvent so as to clean out foreign matter, wet the surfaces, remove air, etc. The solvent may be a different cleaning solvent followed by priming with the processing solution 106 or just done using the processing solution 106.

The priming of the chemical line may be performed upstream of the manifold 35 so as to not introduce processing solution 106 into the manifold 35. Alternatively, the priming may be performed with a dummy filter (or with the older filter to be removed) so that the new filter to be installed is not coated with the processing solution 106.

In various embodiments, some or all the pipes between the source 31 and the nozzle 38 may be repeatedly flushed with the solvent/processing solution 106 during this step. Utilizing the filter vent and the filter bypass commands will ensure that none of the solvent/processing solution 106 enters the older chemical filter 102 presently coupled to the line.

In preparation to remove this chemical filter 102, an embodiment of the step S2 includes closing the older chemical filter 102 off from the feed line. In this step, the filtration apparatus 30 and in particular the manifold 35 is depressurized. For example, all the valves in the valve system such as the first check valve 36a, a second check valve 36b, and a third check valve 36c are closed. This prevents or cuts-off the flow of solvent or the processing solution 106 in the manifold 35. Any processing solution 106 in the manifold 35 or in the feed pipes is drained off.

As next described in step S3, the older chemical filter 102 is safely removed and a newer, "dry" chemical filter 102 is installed to the manifold 305. A "dry" chemical filter 102 is devoid of liquid chemicals. During this process, the protective inlet/outlet caps on the new "dry" chemical filter 102 are removed and the new chemical filter 102 placed within the manifold 35. The chemical filter 102 is properly placed and sealed, e.g., using an O-ring, to ensure a tight fluid seal so that there is no leakage of the processing solution or gas when the system is pressurized again. In other words, there is no leakage from the chemical filter 102 into the outside from the manifold 35.

An embodiment of the step S4 includes initiating the vacuum 34 by applying a negative pressure (relative to the pressure within the chemical filter 102). At this stage, the valve system is switched to operate in the second operating state. After starting the vacuum, the first check valve 36a and the third check valve 36c remain closed while the second check valve 36b is opened. The three-way valve 33 is then switched manually or using a controller so that the vacuum 34 is now coupled to the manifold 35. This removes/sucks the air from the manifold 35 and the newly installed chemical filter 102. In various embodiments, the vacuum applied to the manifold 35 may reach a pressure inside the manifold 35 between 10 mTorr and 500 mTorr or lower pressures so as to perform a successful process. As the vacuum 34 pumps down, it draws ambient air from the "dry" chemical filter by applying a negative pressure. By monitoring the vacuum level, it is possible to determine when all of the air has been removed successfully from the chemical filter 102. Accordingly, once a steady vacuum is achieved, the vacuum 304 and its external pump can be turned off.

While still holding vacuum 304, in step S5, the chemical filter 102 and manifold 35 are closed off from the vacuum 304. This is done by closing the second check valve 36b and opening the first check valve 36a and switching the three-way valve 33 manually or using a controller so as to couple the feed line to the manifold 35. Thus, the settings from filter vent and filter bypass are restored back to dispense line settings.

Referring next to step S6, the processing solution 106 is introduced to the "dry" chemical filter 102. However, prior to this, the inert gas 32 is depressurized to avoid having the processing solution 106 gush into the chemical filter 102 so as to cause damage. For example, the pressure of the inert gas 32 may be reduced by a large magnitude, for example, from 50 Torr to 250 Torr in one illustration, or even an order of magnitude.

Referring next to step S7, the processing solution 106 is dispensed from the chemical source 31, through the chemical filter 102, and the pump 41 out of the nozzle 38. Prior to dispensing the processing solution 106 onto the wafer 39, the dispensing line between the manifold 35 and the nozzle 38 may be flushed. This may be performed in stages, for example, the pump 41 may be first flushed followed by the AOV 37 and the lines between the AOV 37 and the nozzle 38. This is to avoid any damage to the wafer 39 from foreign particles, air bubbles, or other debris. After flushing the dispensing line, the processing solution 106 may be dispensed around the wafer 39 into baths placed within the chamber 42, for example.

The wafer 39 is now ready to be processed by the processing solution 106 and may be processed in accordance with the process recipe.

Figure 3A:
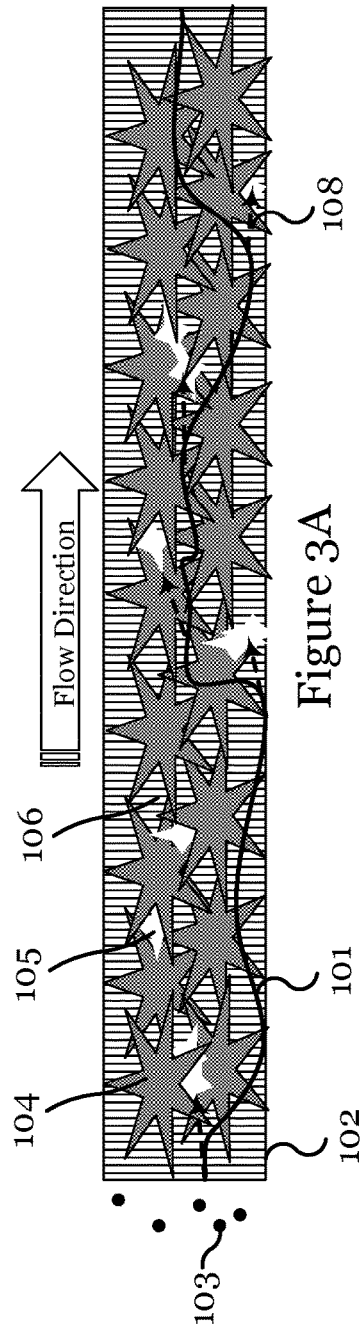
Figure 3B:
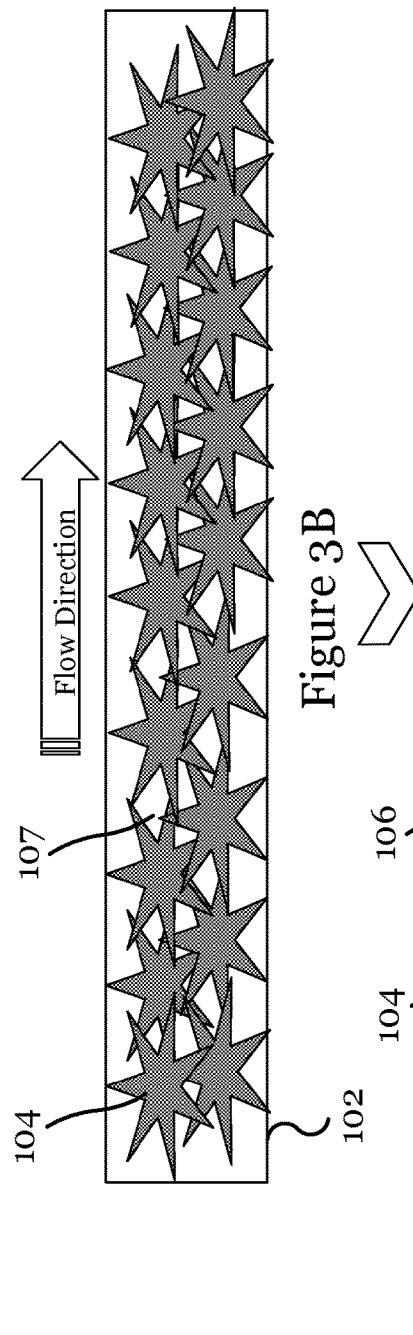
Figure 3C:
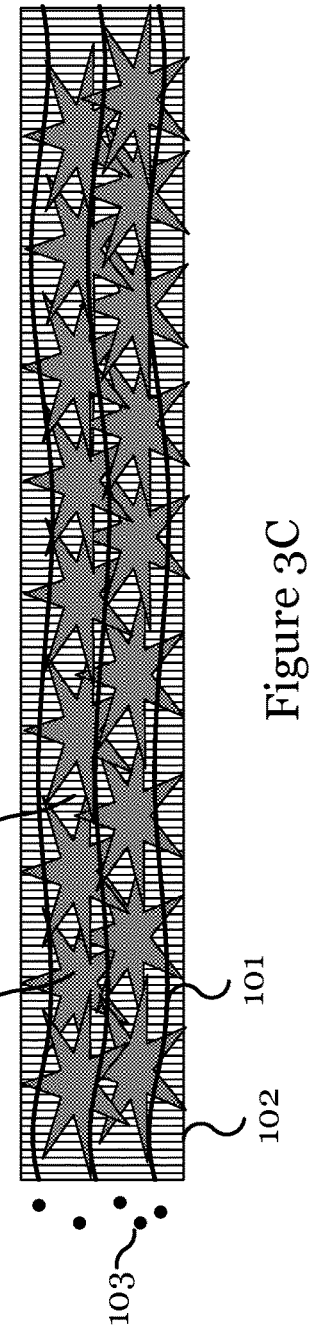

A detailed description of the working of the above process will be explained using FIGS. 3A-3C. FIGS. 3A-3C illustrate a cross sectional schematic magnified representation of a chemical filter in accordance with an embodiment of the present invention.

In greater detail, and as illustrated schematically in FIG. 3A, the chemical filter 102 comprises a filtration material 104 that fills a compartmental shell within the chemical filter 102. In one illustration, the filtration material 104 may be a meshing of polymer fibers that sieves foreign matter 103 (i.e., small particles, debris, extraneous particulates, and others) from the processing solution 106.

As previously described, the processing solution 106 travels through the chemical filter 102 in the direction of flow designated by the arrow. As the processing solution 106 flows through the chemical filter 102, it may include foreign matter 103. The foreign matter 103 immersed in the processing solution 106, follows a natural flow trajectory (designated by the black trace line) along nonspecific (undefined) filtration channels 101.

Ideally, the filtration channels 101 are represented by clear, unblocked fluid pathways and openings within the filtration material 104. Thus, the foreign matter 103 would travel freely along the filtration channels 101. However, in the absence of using the vacuum assisted change of chemical filter as described in various embodiments of this application, the filtration channels 101 may include air voids 105. These may be introduced during its manufacturing and packaging stages as well as introduced at the time of the installing the chemical filter 102 into the manifold 35.

Consequently, as the foreign matter 103 travels along the filtration channels 101, it may encounter air voids 105. The air voids 105 cause a blockage 108 (designated by the dashed lines in FIG. 3A) within the filtration channels 101, thus interrupting the natural trajectory of the foreign matter 103 through the filtration material 104.

Depending on the concentration of the air voids 105 within the filtration material 104, the number of clear, unblocked pathways decrease so as to reduce the number of available filtration channels 101. This decrease in the number of the filtration channels 101 negatively impacts the wetting efficiency of the chemical filter 102. In other words, the air voids 105 effectively reduce the surface area of the chemical filter 102 that the processing solution 106 contacts, which reduces filtration efficiency.

FIG. 3B illustrates a chemical filter 102 before installation into the manifold 35. Ambient air 107 from the manufacturing/packaging surrounds the filtration material 104.

In contrast, as depicted in FIG. 3B, using one or more embodiments of installing the chemical filter 102, the concentration of air voids 105 significantly reduces because of the use of vacuum 34 to suck up the air from the chemical filter 102. Unlike the prior illustration of FIG. 3A, because of the use of the external vacuum pump, the air voids 105 that would otherwise be formed within the chemical filter 102 are reduced. The external vacuum pump reduces the internal pressure within the chemical filter 102 by applying a negative pressure. The large negative pressure of the order of 10 mTorr and 500 mTorr efficiently removes the ambient air 107.

Accordingly, once the processing solution 106 is introduced into the evacuated chemical filter 102 (which remains held at low pressure state), the foreign matter 103 that is carried through the processing solution 106 is able to travel more freely, without encountering a blockage 108 from the air voids 105. Absence of the air voids 105 within the filtration material 104 increases the number of filtration channels 101 (as denoted by the black trace lines shown in FIG. 3C). Overall, the vacuum assistance improves the wettability of the chemical filter 102, thus increasing its efficiency at filtering the foreign matter 103 from the processing solution 106.

Accordingly, embodiments of the present application disclose using a vacuum system to remove air from a newly added chemical filter. For example, after an optional priming process, the chemical line upstream of the manifold 35 is closed off by the three-way valve 33, thus preventing the flow of the processing solution 106.

With the chemical line closed off, the "dry" chemical filter 102 is safely installed. Once the "dry" chemical filter 102 is installed within the manifold 35, the vacuum 34 and its external pump can be initiated (as discussed in the step S4 of FIG. 2). As detailed above, as the vacuum 34 pumps down, ambient air 107 is drawn out from the "dry" chemical filter. Because the manifold 35 is airtight, the chemical filter 102 still maintains its low pressure state (i.e., it holds its current vacuum level). At this stage, the three-way valve 33 is triggered to close off the vacuum 34 portion of the chemical line and open the dispense line, thus returning the filtration system to its original settings (as discussed in the step S5).

In accordance with the steps S6-7, a positive pressure is applied through the inert gas 32 to the chemical source 31. The positive pressure from the inert gas 32 draws the processing solution 106 from the chemical source 31. The processing solution 106 exits the pressurized source 31, traveling along the direction indicated by the arrows (see FIG. 1). Eventually the processing solution 106 reaches the first check valve 36a. Once the processing solution 106 passes through the first check valve 36a, it travels onto the three-way valve 33, which directs the processing solution 106 into the chemical filter 102 that is housed within the manifold 35.

Since the chemical filter 102 (while still maintaining a designated vacuum level) has been evacuated of the ambient air, the processing solution 106 enters the chambers of the chemical filter 102. Consequently, the processing solution 106 fully wets the surface since the air voids 105 that once blocked the filtration channels 101 no longer exist. This improved wetting efficiency resulting in a better filtering of the processing solution 106 from the foreign matter 103. The filtered processing solution 106 exits the chemical filter 102 and dispensed on the wafer 39 for further processing.

Figure 4:
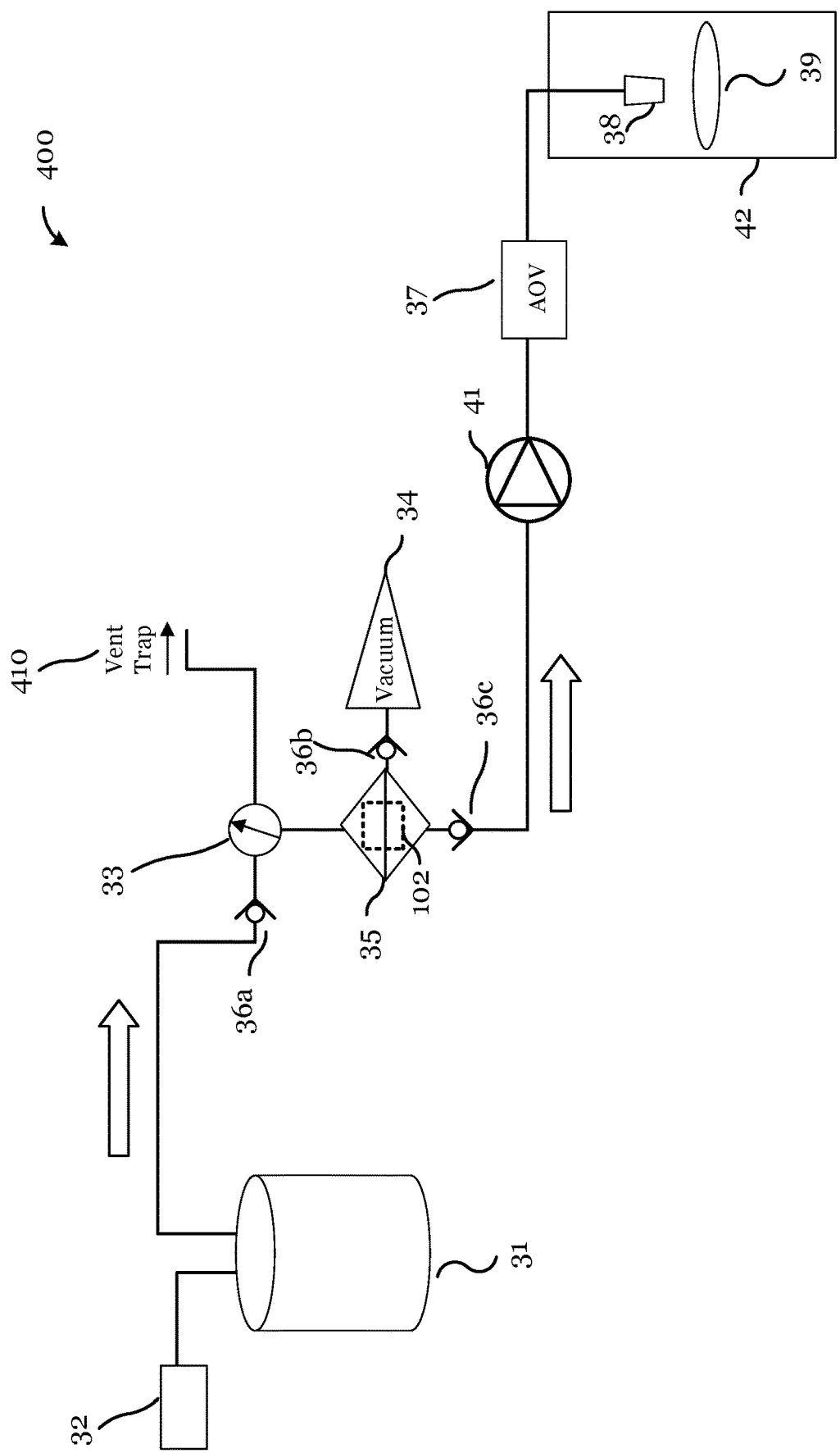
FIG. 4 illustrates a piping diagram of a filtration apparatus in accordance with an alternative embodiment of the present invention.

FIG. 4 illustrates a piping diagram of a filtration apparatus in accordance with an alternative embodiment of the present invention. This embodiment differs in the configurations for the vacuum and its pumping system.

In contrast to the vacuum configuration of FIG. 1, in which the vacuum 34 is configured to be applied upstream of the chemical filter 102, in this embodiment, the vacuum 34 is configured to be applied downstream of the chemical filter 102.

In this particular embodiment of the vacuum assisted filtration apparatus 400, a vent trap 410 may be coupled to the second configuration of the three-way valve 33. The vacuum 34 and its pumping system are directly coupled to the manifold 35 (without going through the three-way valve 33) through the second check valve 36b. All of the components directly downstream of the chemical filter 102 may be configured in the same manner as described above in FIG. 1.

Despite of the alternate configuration of the vacuum 34 and its pumping system, the process flow would still follow the same convention as described above. As in the prior embodiment, in the first operating state, the first check valve 36a will be opened and the three-way valve 33 will fluidly couple the source 31 to the manifold 35. However, in the second operating state, the second check valve 36b will be opened to connect the vacuum 34 to the manifold 35 while the three-way valve 33 will be coupled to the vent trap 41.

Figure 5A:
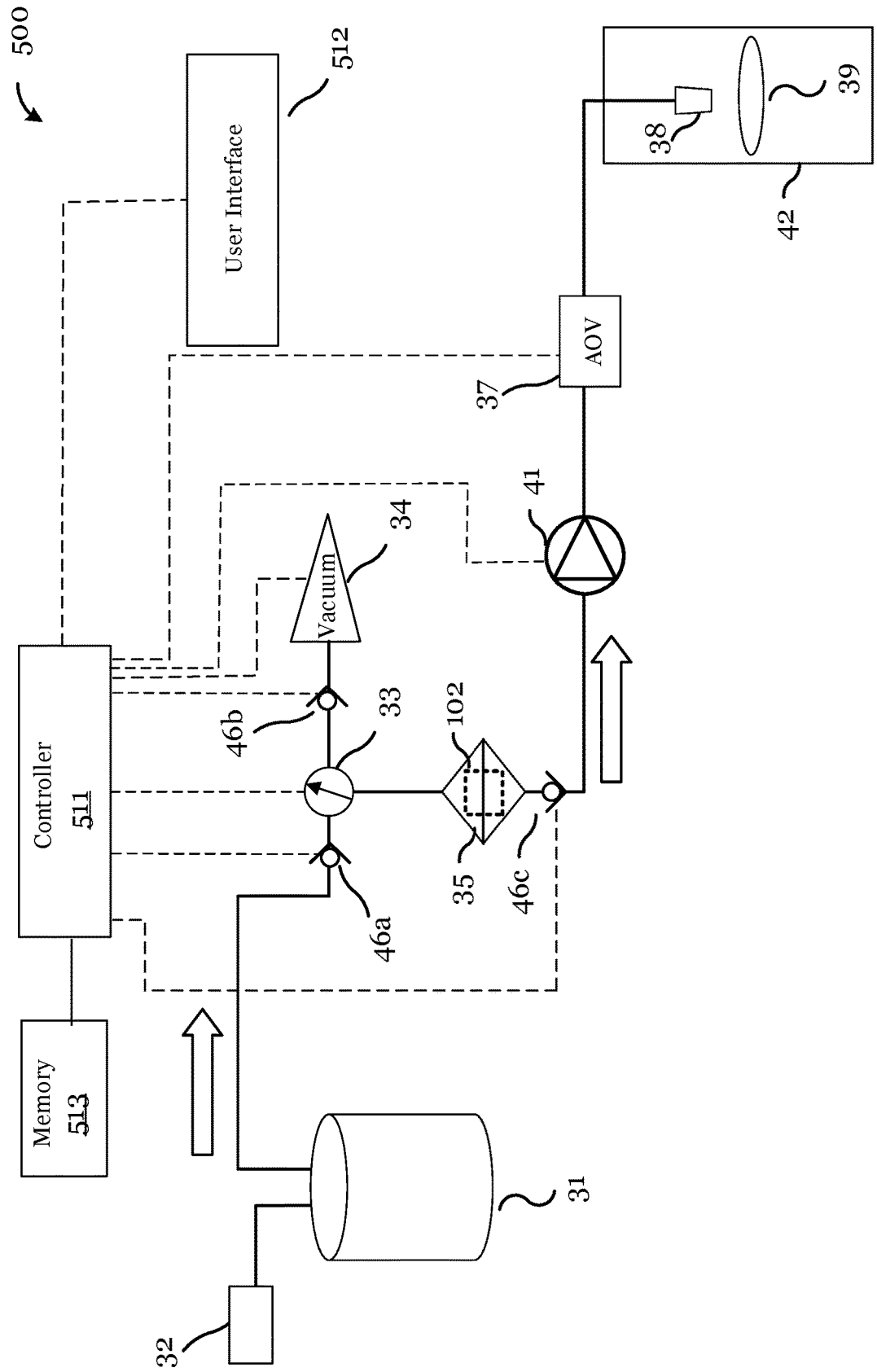
FIGS. 5A-5B illustrate alternative configurations of a filtration system using electronic components to switch operating states in accordance with an embodiment of the present invention.
Figure 5B:
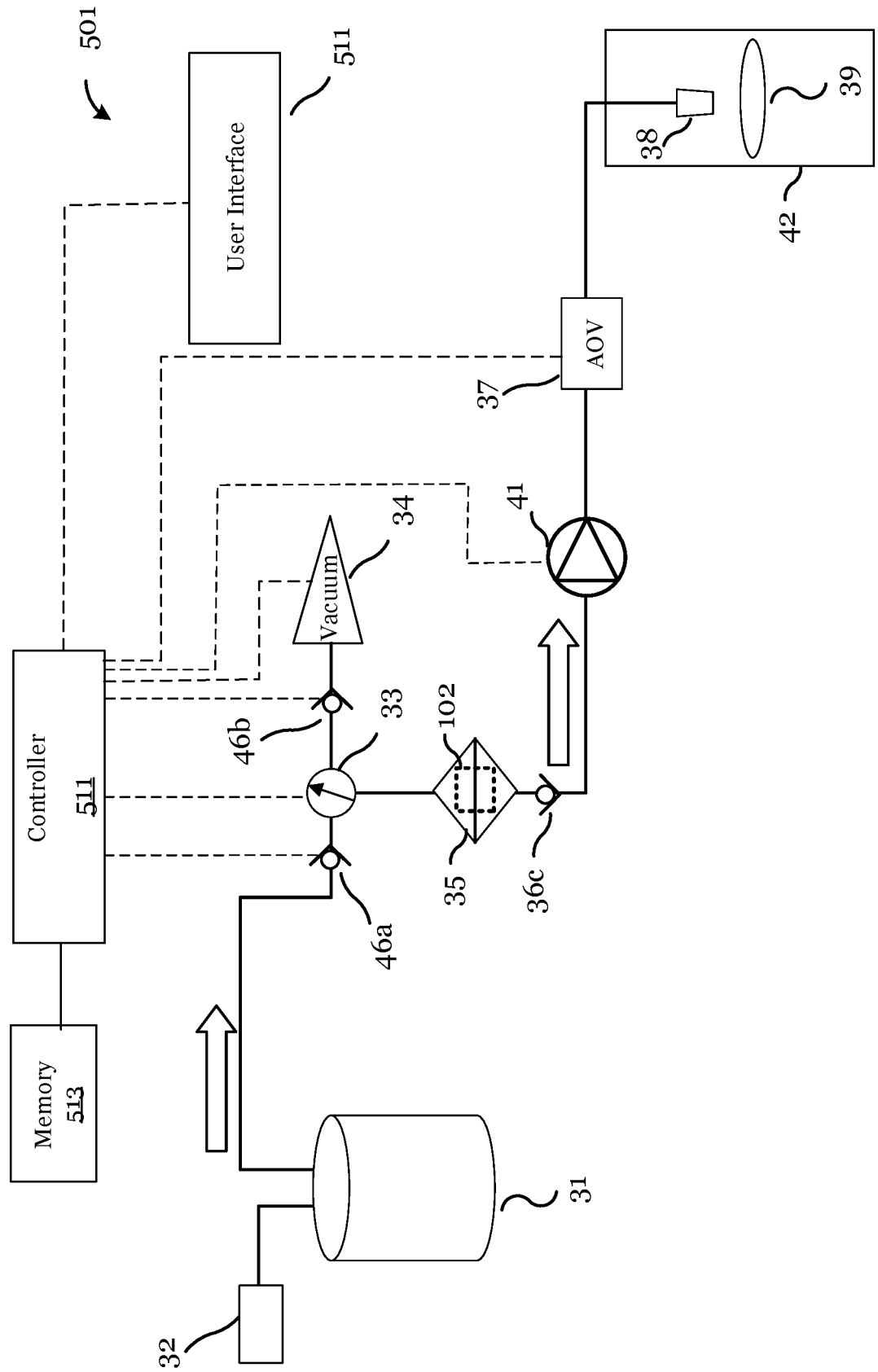

FIGS. 5A-5B illustrate alternate configurations of the piping diagram for the vacuum assisted filtration apparatus 500 and 501, in which electronic components have been incorporated to switch operating states, all in accordance with an embodiment of the present invention. It should be noted that in each embodiment illustrated in FIG. 5A-5B, the resulting arrangement of the vacuum 34 and its pumping system can take on the various configurations as described above in FIG. 1 or 4.

These embodiments use electronic control to switch operating states, i.e., automatically connect/disconnect vacuum as well as to monitor vacuum and accomplish any of the other process steps discussed before. The electrical signal connections are illustrated in dashed lines to not confuse with the fluid flow like that are indicated with solid lines.

In FIG. 5A, in alternate embodiments of vacuum assisted filtration apparatus 500, the electronic control valves 46a, 46b, and 46c are being controlled with a controller 511. Accordingly, in this embodiment, electronic control valves 46a and 46b are located on either sides of the three-way valve 33 and a third electronic control valve 46c is located on the exit side of the chemical filter 102. Additionally, a user interface 512 may be used to receive user input to initiate one or more process steps. The input from the user interface 512 is sent to the controller 511, which may process them to generate separate control signals that are transmitted to synchronize the operation of the various components such as the three-way valve 33, the electronic control valves 46a, 46b, and 46C, the vacuum 34, the pump 41, and the AOV 37.

FIG. 5B illustrates an alternate embodiment of the vacuum assisted filtration apparatus 501 in which some of the valves may be check valves as illustrated in this embodiment. In this embodiment, the electronic control valves 46a and 46b are located on either sides of the three-way valve 33 while a check valve 36c is located on the exit side of the chemical filter 102.

According to various embodiments of the invention, the vacuum assisted filtration apparatus may comprise one or more processors, e.g., represented as controller 511, and a memory 513 storing a program to be executed in a processor. In various embodiments, the program when executed by the processor may perform the processes described in various embodiments such as using FIG. 2.

In one or more embodiments, the program may further comprise instructions to shut off a chemical feed line supplying a processing solution 106 to the chemical filter 102. Additionally, after installation of the chemical filter 102 within a manifold 35 (or housing), the program may comprise instructions to close an output chemical line from the manifold 35 to the nozzle 38. In other embodiments, the program may give instructions to apply a vacuum 34 to the chemical filter 102 and the manifold 35. The program may include further instructions to open the chemical feed lines while holding the vacuum 34 so it is maintained within the chemical filter 102.

In other embodiments, the program may comprise further instructions for opening the output chemical line after filling the chemical filter 102 with processing solution 106. Likewise, the program may comprise further instructions for venting the processing solution 106 before applying the vacuum 34 and its pumping system. The program may also comprise further instructions for reaching a determined pressure inside the chemical filter 102 of between 10 mTorr and 500 mTorr.

Accordingly, application of the embodiments of the invention may reduce the volume of chemical required to fully wet a small pore sized filter, resulting in higher wetting volume efficiency. The result of higher wetting efficiency will reduce particles generated at the filter surface, and reduce the amount of processing solution 106 used for an installation and requalification process. Advantageously, the filtration system can be used with a plethora of aqueous materials.

Example embodiments of the invention are summarized here. Other embodiments can also be understood from the entirety of the specification as well as the claims filed herein.

Example 1. An apparatus includes a chemical filter fluidly coupled between a source for a processing solution and a nozzle to dispense the processing solution. The chemical filter is configured to filter the processing solution from the source. The apparatus may include a vacuum pump that is configured to apply a vacuum to the chemical filter. The apparatus may include a valve system configured to operate in a first operating state and a second operating state, where in the first operating state the valve system is configured to couple the source to the chemical filter and block the vacuum to the chemical filter, and where in the second operating state the valve system is configured to couple the vacuum to the chemical filter and block the source to the chemical filter.

Example 2. The apparatus of example 1, further including: a controller configured to switch the valve system from the first operating state to the second operating state.

Example 3. The apparatus of one of examples 1 or 2, where the valve system includes a three-way valve that switches the valve system between the first operating state and the second operating state.

Example 4. The apparatus of one of examples 1 to 3, where the chemical filter includes: a housing including a first port configured to be coupled to the source or the vacuum pump, a second port coupled to the nozzle, a third port coupled to an exhaust vent; and a filter disposed in the housing. In an illustration (FIG. 6A), the chemical filter includes a housing including a first port 601 configured to be coupled to the source 31 or the vacuum pump 34, a second port 602 coupled to the nozzle 38, a third port 603 coupled to an exhaust vent 605; and a filter 102 disposed in the housing.

Example 5. The apparatus of one of examples 1 to 4, where the chemical filter includes: a housing including a first port coupled to the source, a second port coupled to the nozzle, a third port coupled to an exhaust vent, and a fourth port coupled to the vacuum pump; and a chemical filter disposed in the housing. In an illustration (FIG. 6B), the chemical filter includes: a housing including a first port 611 coupled to the source 31, a second port 612 coupled to the nozzle 38, a third port 613 coupled to an exhaust vent 605, and a fourth port 614 coupled to the vacuum pump 34; and a chemical filter 102 disposed in the housing.

Example 6. The apparatus of one of examples 1 to 5, where the chemical filter includes: a housing including a first port configured to be coupled to the nozzle or the vacuum pump, a second port coupled to the source, a third port coupled to an exhaust vent; and a chemical filter disposed in the housing. In an illustration (FIG. 6C), the chemical filter includes: a housing including a first port 621 configured to be coupled to the nozzle 38 or the vacuum pump 34, a second port 622 coupled to the source 31, a third port 623 coupled to an exhaust vent 605; and a chemical filter 102 disposed in the housing.

Example 7. The apparatus of one of examples 1 to 6, further including a vent system coupled to the chemical filter, where the vent system is configured to flush the processing solution.

Example 8. A method of supplying a processing solution includes shutting off a feed line supplying the processing solution to a chemical filter and installing a dry chemical filter in a filter housing of the chemical filter. The method may further include closing an output line from the filter housing to a nozzle configured to dispense the processing solution. The method may further include applying vacuum to the filter housing. The method may further include opening the feed line while locking in the vacuum within the filter housing.

Example 9. The method of example 8, further including opening the output line after filling the filter housing with the processing solution.

Example 10. The method of one of examples 8 or 9, further including removing a used chemical filter from the filter housing before installing the dry chemical filter.

Example 11. The method of one of examples 8 to 10, further including venting the processing solution before applying the vacuum.

Example 12. The method of one of examples 8 to 11, where the processing solution includes chemicals for a photolithography process, wet cleaning process, deposition process liquid precursor, etching process liquid precursor, or other chemical processes involved in semiconductor process that use filtration to maintain manufacturability.

Example 13. The method of one of examples 8 to 12, where installing the chemical filter in the filter housing includes installing a dry chemical filter that is devoid of liquid chemicals before the installing.

Example 14. The method of one of examples 8 to 13, where applying the vacuum to the filter housing includes reaching a pressure inside the filter housing between 10 mTorr and 500 mTorr.

Example 15. The method of one of examples 8 to 14, further including processing a semiconductor wafer with the chemical dispensed from the nozzle.

Example 16. A device includes a memory storing a program to be executed in a processor. The program includes instructions to shut off a feed line supplying a processing solution to a chemical filter. The program may include instructions to close an output line from the filter housing to a nozzle configured to dispense the processing solution after installing a chemical filter in a filter housing of the chemical filter. The program may include instructions to apply vacuum to the filter housing; and open the feed line while locking in the vacuum within the filter housing.

Example 17. The device of example 16, where the program includes further instructions for opening the output line after filling the filter housing with the processing solution.

Example 18. The device of one of examples 16 or 17, where the program includes further instructions for venting the processing solution before applying the vacuum.

Example 19. The device of one of examples 16 to 18, where the program includes further instructions for reaching a pressure inside the filter housing between 10 mTorr and 500 mTorr, or lower pressures.

Example 20. The device of one of examples 16 to 19, further including a processor to execute the program.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of installing a dry chemical filter used to supply a processing solution, the method comprising:
shutting off a feed line supplying the processing solution to a chemical filter;
closing an output line from a filter housing to a nozzle configured to dispense the processing solution;
while the feed line and the output line remain shut,
installing the dry chemical filter in the filter housing of the chemical filter, and
applying a vacuum to the filter housing;
closing off the dry chemical filter and the filter housing from the vacuum to lock in the vacuum; and
opening the feed line while locking in the vacuum within the filter housing.

2. The method of claim 1, wherein the vacuum is applied directly to the filter housing while the feed line remains shut.

3. The method of claim 1, further comprising removing a used chemical filter from the filter housing before installing the dry chemical filter.

4. The method of claim 1, further comprising depressurizing the processing solution before applying the vacuum.

5. The method of claim 4, wherein depressurizing the processing solution comprises reducing the pressure from about 250 Torr to about 50 Torr.

6. The method of claim 1, wherein the processing solution comprises chemicals for a photolithography process, wet cleaning process, deposition process liquid precursor, or etching process liquid precursor.

7. The method of claim 1, wherein installing the chemical filter in the filter housing comprises installing a dry chemical filter that is devoid of liquid chemicals before the installing.

8. The method of claim 1, wherein applying the vacuum to the filter housing comprises reaching a pressure inside the filter housing between about 10 mTorr and about 500 mTorr before opening the feed line.

9. The method of claim 1, further comprising:
monitoring pressure inside the filter housing until reaching a steady-state pressure, wherein opening the feed line comprises opening the feed line in response to reaching the steady-state pressure.

10. The method of claim 1, further comprising processing a semiconductor wafer with the processing solution dispensed from the nozzle.

11. The method of claim 1, further comprising:
closing a feed valve between the feed line and the chemical filter to shut off the feed line;
closing a vacuum valve between the vacuum and the chemical filter;
closing a dispense valve between the output line and the chemical filter; and
locking in the vacuum within the filter housing by closing the vacuum valve,
wherein installing the dry chemical filter and applying the vacuum to the filter housing are performed while the feed valve, the vacuum valve, and the dispense valve remain closed.

12. The method of claim 11, wherein the vacuum is applied directly to the filter housing while the feed valve, the vacuum valve, and the dispense valve remain closed.

13. A method of installing a dry chemical filter used to supply a processing solution, the method comprising:
- shutting off a feed line supplying the processing solution to a chemical filter;
- closing an output line from a filter housing to a nozzle configured to dispense the processing solution;
- while the feed line and the output line remain shut,
  - installing the dry chemical filter in the filter housing of the chemical filter,
  - applying a vacuum directly to the filter housing, and
  - monitoring pressure inside the filter housing until reaching a steady-state pressure; and
- in response to reaching the steady-state pressure,
  - closing off the dry chemical filter and the filter housing from the vacuum to lock in the vacuum, and
  - opening the feed line while locking in the vacuum within the filter housing.

* * * * *